United States Patent
Fetscher et al.

(10) Patent No.: US 12,022,753 B2
(45) Date of Patent: Jul. 2, 2024

(54) ATTACHMENT DEVICE FOR USE WITH A CARRIER VEHICLE, AND METHOD OF OPERATING THE ATTACHMENT DEVICE

(71) Applicant: PRINOTH GmbH, Herdwangen (DE)

(72) Inventors: Kai Fetscher, Eigeltingen (DE); Daniel Braun, Radolfzell (DE); Markus Hosti, Stockach (DE)

(73) Assignee: PRINOTH GmbH, Herdwangen (DE)

( * ) Notice: Subject to any disclaimer, the term of this patent is extended or adjusted under 35 U.S.C. 154(b) by 931 days.

(21) Appl. No.: 17/047,856

(22) PCT Filed: Apr. 10, 2019

(86) PCT No.: PCT/EP2019/059155
§ 371 (c)(1),
(2) Date: Oct. 15, 2020

(87) PCT Pub. No.: WO2019/206643
PCT Pub. Date: Oct. 31, 2019

(65) Prior Publication Data
US 2021/0112707 A1  Apr. 22, 2021

(30) Foreign Application Priority Data

Apr. 27, 2018 (DE) ..................... 10 2018 110 206.2

(51) Int. Cl.
*A01B 63/00* (2006.01)
*A01G 23/06* (2006.01)
(Continued)

(52) U.S. Cl.
CPC .......... *A01B 63/002* (2013.01); *A01G 23/067* (2013.01); *B60G 17/0195* (2013.01);
(Continued)

(58) Field of Classification Search
CPC ..... E01C 23/088; E01C 23/127; E01H 5/098; F02D 29/00; B60W 10/30; B60W 50/085;
(Continued)

(56) References Cited

U.S. PATENT DOCUMENTS

| 5,957,213 A | 9/1999 | Loraas |
| 7,011,124 B1 | 3/2006 | Morey |

(Continued)

FOREIGN PATENT DOCUMENTS

| DE | 2418578 A1 | 11/1974 |
| DE | 10011498 B4 | 12/2004 |

(Continued)

OTHER PUBLICATIONS

Office Action dated Jan. 5, 2023 issued in corresponding patent application No. EP 19 719 771.8 (and English translation).
(Continued)

*Primary Examiner* — Arpad Fabian-Kovacs
(74) *Attorney, Agent, or Firm* — Posz Law Group, PLC (57) ABSTRACT

An attachment device, in particular a milling machine and/or a mulcher, for use with a carrier vehicle, includes one or more functional units which supplies energy by way of the carrier vehicle, in order to achieve rapid and/or simple initial start-up. The attachment device has one or more control units which, in at least one operating state, automatically controls and/or regulates one or more limit values of an operating parameter of the functional unit.

23 Claims, 4 Drawing Sheets

(51) Int. Cl.
*B60G 17/0195* (2006.01)
*A01B 59/042* (2006.01)
*A01B 69/00* (2006.01)
*A01B 79/00* (2006.01)
*A01C 19/00* (2006.01)
*A01D 34/00* (2006.01)
*A01D 34/43* (2006.01)
*A01D 34/58* (2006.01)
*B60W 10/30* (2006.01)
*B60W 50/08* (2020.01)
*E01C 23/088* (2006.01)
*E01C 23/12* (2006.01)
*E01H 5/09* (2006.01)
*E02F 3/96* (2006.01)
*F02D 29/00* (2006.01)

(52) U.S. Cl.
CPC .......... *A01B 59/042* (2013.01); *A01B 69/001* (2013.01); *A01B 79/005* (2013.01); *A01C 19/00* (2013.01); *A01D 34/005* (2013.01); *A01D 34/43* (2013.01); *A01D 34/58* (2013.01); *B60W 10/30* (2013.01); *B60W 50/085* (2013.01); *E01C 23/088* (2013.01); *E01C 23/127* (2013.01); *E01H 5/098* (2013.01); *E02F 3/96* (2013.01); *F02D 29/00* (2013.01)

(58) Field of Classification Search
CPC .. B60G 17/0195; A01D 34/005; A01D 34/43; A01D 34/58; A01C 19/00; A01B 63/002; A01B 33/021; A01B 33/065; A01B 59/042; A01B 69/001; A01B 79/005; A01G 23/067; E02F 3/96
See application file for complete search history.

(56) References Cited

U.S. PATENT DOCUMENTS

| | | | |
|---|---|---|---|
| 7,934,523 B2 | 5/2011 | Little | |
| 7,937,923 B2 | 5/2011 | Biziorek | |
| 8,109,303 B1 | 2/2012 | Holmes | |
| 8,958,959 B2* | 2/2015 | von Schonebeck | B60W 10/30 |
| | | | 123/565 |
| 10,577,759 B2* | 3/2020 | Avans | E01C 23/127 |
| 11,015,305 B1* | 5/2021 | Engelmann | B62D 55/116 |
| 11,632,897 B2* | 4/2023 | Ehlert | A01B 79/005 |
| | | | 701/50 |
| 2004/0040276 A1 | 3/2004 | Allworden et al. | |
| 2011/0193397 A1* | 8/2011 | Menzenbach | E01C 23/088 |
| | | | 299/1.5 |
| 2013/0333664 A1* | 12/2013 | Killion | F02D 29/00 |
| | | | 123/339.16 |
| 2015/0227120 A1* | 8/2015 | Laux | G05B 13/021 |
| | | | 299/1.5 |
| 2016/0060828 A1* | 3/2016 | Killion | E01C 23/127 |
| | | | 299/1.5 |
| 2017/0167089 A1* | 6/2017 | Marsolek | E01C 19/00 |
| 2019/0136468 A1* | 5/2019 | Avans | G01L 1/2225 |
| 2019/0226281 A1* | 7/2019 | Sewell | F16H 63/30 |
| 2020/0199829 A1* | 6/2020 | Avans | E01C 23/127 |
| 2022/0372716 A1* | 11/2022 | Mashek | E01C 23/088 |

FOREIGN PATENT DOCUMENTS

| | | | | |
|---|---|---|---|---|
| DE | 102005005557 A1 | | 8/2006 | |
| DE | 102017130694 A1 * | | 6/2019 | .......... A01B 69/001 |
| EP | 1344443 A1 | | 9/2003 | |
| EP | 2556735 A1 | | 2/2013 | |
| EP | 3243367 A2 * | | 11/2017 | .......... A01B 59/042 |
| WO | WO-0161270 A1 * | | 8/2001 | .......... A01B 33/021 |
| WO | 2017/167685 A1 | | 10/2017 | |
| WO | WO-2017167685 A1 * | | 10/2017 | ............ E01H 5/098 |
| WO | WO-2020135923 A1 * | | 7/2020 | .......... E01C 23/088 |

OTHER PUBLICATIONS

Office Action dated Dec. 20, 2018 issued in corresponding DE patent application No. 10 2018 110206.2 (and English translation).
International Search Report dated Jul. 16, 2019 issued in corresponding International Patent Application No. PCT/EP2019/059155.
International Preliminary Report dated Oct. 27, 2020 issued in corresponding International Patent Application No. PCT/EP2019/059155.
Office Action mailed Feb. 15, 2024 in corresponding Australian Patent Application No. 2019259739.
Office Action mailed Jan. 22, 2024 in corresponding Canadian Patent Application No. 3,097,941.

* cited by examiner

ATTACHMENT DEVICE FOR USE WITH A CARRIER VEHICLE, AND METHOD OF OPERATING THE ATTACHMENT DEVICE

CROSS REFERENCE TO RELATED APPLICATIONS

This application is a U.S. national stage application of PCT/EP2019/059155 filed on Apr. 10, 2019, which is based on German Patent Application No. 10 2018 110 206.2 filed on Apr. 27, 2018, the contents of which are incorporated herein by reference.

The invention relates to an attachment device in accordance with the preamble of claim 1 and to a method for operating an attachment device in accordance with the preamble of claim 14.

A mulcher for use with a carrier vehicle, for example a tractor, is already known from the prior art. Said mulcher has a hydraulic motor with a maximum and a minimum displacement volume, and can be driven via a hydraulic supply of the carrier vehicle. The maximum displacement volume and the minimum displacement volume are set manually following a mounting of the mulcher on the carrier vehicle and before a start-up of the carrier vehicle and the mulcher, and cannot be changed during the use of the mulcher. A non-optimum setting of the minimum and/or maximum displacement volume can have the consequence of a performance reduction of the mulcher. Furthermore, an operating state of the mulcher and the carrier vehicle has to be interrupted for each change of the minimum and/or maximum displacement volume, and a manual adjustment of the minimum and/or maximum displacement volume has to be carried out by skilled staff. Here, a comminuting rotor of the mulcher has to be brought to a standstill each time, and subsequently has to be started up again and brought to a nominal rotational speed. If the mulcher is braked during the operating state by way of material to be comminuted, an input pressure of the carrier vehicle rises. In the case of the input pressure exceeding a threshold pressure, the displacement volume of the hydraulic motor is changed hydraulically and rises from the minimum displacement volume as far as the maximum displacement volume. As a result, a rotational speed of the mulcher is reduced, and a torque which is provided by the hydraulic motor of the mulcher is increased in order to ensure effective comminution of the material.

The objective of the invention is in particular to provide a generic device with improved properties with regard to a simpler and/or fast start-up. According to the invention, the objective is achieved by way of the features of patent claims 1 and 14 while advantageous implementations and further developments of the invention can be gathered from the sub-claims.

The invention proceeds from an attachment device, in particular a milling machine and/or a mulcher, for use with a carrier vehicle, with at least one functional unit which is configured for a supply of energy by way of the carrier vehicle.

It is proposed that the attachment device has at least one control unit, in particular a control and/or regulation unit which, in at least one operating state, automatically controls and/or regulates at least one limit value of an operating parameter of the functional unit. As a result, a simple and/or rapid initial start-up can advantageously be achieved. Manual operations and/or skilled staff for setting and/or regulating the limit value can advantageously be dispensed with, as a result of which, in particular, costs can be saved. A change and/or an initial start-up of the attachment device and/or carrier vehicle can particularly advantageously be carried out rapidly and simply. In addition, the attachment device can be operated with optimum settings in order to achieve performance optimization.

An "attachment device" is to be understood to mean, in particular, a unit which is configured to provide at least one predefined function by means of its functional unit, and which can be mounted on a carrier vehicle, in particular on various carrier vehicles, in particular of various types. The appliance unit can be, for example, any desired construction and/or agricultural and/or preferably forestry appliance unit which appears appropriate to a person skilled in the art, in particular tongs and/or a gripper and/or a pile driver and/or a saw and/or a reaper and/or preferably a milling machine, in particular an asphalt milling machine and/or a stump grinder and/or a rotavator and/or a snow blower and/or a mulch-milling machine. A "functional unit" is to be understood to mean, in particular, a unit which carries out the predefined function of the attachment device. The functional unit can have, for example, at least one saw blade and/or one milling tool and/or one cutting tool and/or one rotor, in particular a comminuting rotor, and/or one gripping arm and/or one ram and/or one pair of tongs.

A "carrier vehicle" is to be understood to mean, in particular, a vehicle which is configured to be equipped with at least one attachment device for carrying out a function of the attachment device. In particular, the attachment device can be pulled, pushed, carried, lifted, lowered and/or pivoted by a carrier vehicle. The carrier vehicle preferably has at least one support unit which is configured to support the attachment device on the carrier vehicle. In a mounted state, the support unit advantageously realizes at least one shared positive-locking connection with at least one corresponding support means of the attachment device. The carrier vehicle can be, in particular, a vehicle for landscape maintenance, a snow removal vehicle, an agricultural vehicle, a construction vehicle and/or another vehicle which is suitable for use with the attachment device. The carrier vehicle is preferably a tractor and/or a tracked vehicle and/or an excavator and/or a wheel loader and/or a skid steer loader.

The fact that the functional unit "is configured for a supply of energy by way of the carrier vehicle" is in particular to mean that the functional unit requires at least one type of energy which is supplied by the carrier vehicle in the operating state in order to carry out the function. In particular, the energy can comprise electric, mechanical and/or hydraulic energy. In particular, the carrier vehicle has a supply unit for the supply of the attachment device with energy, to be precise, in particular, a mechanical, hydraulic, pneumatic and/or electric energy supply unit. The carrier vehicle advantageously has at least one connecting unit which is configured for the transmission of energy from the carrier vehicle to the functional unit. The connecting unit can have, in particular, at least one electric line and/or preferably at least one hose. For example, the attachment device, in particular the functional unit, can have at least one hydraulic motor which can be driven via a hydraulic supply unit of the carrier vehicle.

A "hydraulic motor" is to be understood to mean, in particular, a unit which, in at least one operating state, converts at least one form of hydraulic energy into at least one form of mechanical energy. In particular, the hydraulic motor has at least one transmission unit for the transfer of the hydraulic energy into the mechanical energy. The attachment device advantageously has at least one energy transmission unit which is configured to transmit the mechanical energy to a further unit of the functional unit. For example, the energy transmission unit might have at least one flexible drive, for example a belt mechanism, and/or a piston mechanism and/or a gearwheel mechanism. The supply unit of the carrier vehicle advantageously has at least one hydraulic pump for a supply of the hydraulic motor with the hydraulic energy, which hydraulic pump can be capable of being driven, for example, electrically and/or preferably by means of an internal combustion engine of the carrier vehicle.

A "limit value of an operating parameter" is to be understood to mean, in particular, a pre-defined value of the operating parameter which cannot be reduced and/or increased further in the operating state and/or on the basis of which the control unit initiates at least one predefined process if the value should be exceeded and/or undershot. In particular, the limit value can comprise a maximum, a minimum and/or a threshold value.

An operation which is carried out "automatically" is to be understood to mean, in particular, an operation which, during its execution, proceeds autonomously and, in particular, without an operating action of an operator. In particular, the operator can carry out at least one manual start action for activating the automatic operation. The operator can advantageously carry out a stop action for interrupting and/or stopping the automatic operation.

"Configured" is to be understood to mean, in particular, specifically programmed, designed and/or equipped. The fact that an object is configured for a defined function is in particular to mean that the object fulfills and/or carries out said defined function in at least one use and/or operating state.

Furthermore, it is proposed that the control unit electrically controls and/or regulates the limit value of the operating parameter of the functional unit and/or the operating parameter of the functional unit in the operating state. The control unit advantageously comprises at least one algorithm, in accordance with which the control unit controls and/or regulates the limit value of the operating parameter in the operating state. The algorithm advantageously determines an optimum limit value of the parameter and/or an optimum instantaneous value of the operating parameter, in particular in order to maximize performance of the functional unit. As a result, in particular, a mechanical control and/or regulation of the limit value can be dispensed with. An accuracy and/or speed of the control and/or regulation of the limit value and/or the operating parameter can advantageously be improved. This can particularly advantageously ensure that maximum performance can be constantly provided for the attachment device. Furthermore, additional operations for setting a threshold value, from which the control unit controls and/or regulates the limit value of the operating parameter, can be dispensed with, and any changes in the input pressure and/or the rotational speed can be reacted to immediately.

Furthermore, it is proposed that the control unit controls and/or regulates the limit value of the operating parameter of the functional unit to a setpoint value in the operating state. A "setpoint value" is to be understood to mean, in particular, a value which is fixed as a desired value. The control unit advantageously controls and/or regulates an instantaneous value to the setpoint value in the case of a deviation from the setpoint value. In particular, the setpoint value is defined by way of at least one operating parameter. The control unit advantageously detects the setpoint value automatically. The setpoint value is preferably defined by way of at least one input pressure of the carrier vehicle and/or at least one rotational speed of at least one unit of the attachment device.

The setpoint value particularly preferably serves to optimize performance of the functional unit. It is conceivable that an operator might set the setpoint value. Setting of the setpoint value advantageously takes place automatically by way of the control unit, however. As a result, in particular, high performance of the functional unit can be achieved. In the case of a change of at least one operating parameter, the setpoint value can advantageously be adapted automatically to a changed operating parameter.

Moreover, it is proposed that the control unit controls and/or regulates a further operating parameter of the functional unit in the operating state by way of a control and/or regulation of the limit value of the operating parameter of the functional unit. In particular, the further operating parameter can be performance, a pressure and/or a rotational speed of the attachment device. The setpoint value of the limit of the operating parameter is advantageously defined by way of at least one further setpoint value of the further operating parameter. The further setpoint value of the further operating parameter is preferably realized as a predefined nominal rotational speed of the attachment device. For example, the nominal rotational speed might be defined during production of the attachment device. The setpoint value of the limit value is particularly preferably defined as a value of the operating parameter, at which the attachment device has the nominal rotational speed. As a result, it is in particular possible for a control and/or regulation of the further operating parameter to be provided in a simple way.

Moreover, it is proposed that the attachment device has at least one sensor unit, in particular a sensor unit which is assigned to the functional unit, for the detection of at least one value of at least one operating parameter, in particular the further operating parameter, of the functional unit, the sensor unit providing said value to the control unit for processing in the operating state. For example, the value of the operating parameter can comprise a rotational speed of the attachment device. The attachment device advantageously has at least one transmission unit for a transmission of the detected value from the sensor unit to the control unit. The transmission unit can have, for example, a cable and/or a data bus and/or an antenna and/or a wireless transmitter and/or a radio transmitter. "Processing" is to be understood in this context to mean, in particular, an operation, in the case of which the control unit compares the value with at least one setpoint value and/or at least one further value of a further operating parameter, and initiates at least one further process, for example an increase and/or a decrease of the value, in particular on the basis of the comparison. As a result, in particular, a control and/or regulation of the limit value can be simplified. The detected value can advantageously be involved in the case of fixing of the setpoint value of the limit value. Furthermore, external sensor units for detecting the value can be dispensed with.

Furthermore, it is proposed that the attachment device has at least one sensor unit, in particular a sensor unit which is assigned to the carrier vehicle, for the detection of at least one value of at least one operating parameter of the carrier vehicle, the sensor unit providing said value to the control unit for processing in the operating state. For example, the value of the operating parameter can comprise an input pressure of the carrier vehicle. The attachment device advantageously has at least one transmission unit for transmitting the detected value from the sensor unit to the control unit. The transmission unit can have, for example, a cable and/or a data bus and/or an antenna and/or a wireless transmitter and/or a radio transmitter. As a result, in particular, a control and/or regulation of the limit value can be simplified. Simple and rapid setting of the attachment device to a new carrier vehicle can advantageously be achieved in the case of a change of the carrier vehicle.

In particular, the attachment device can have a sensor unit which comprises the sensor unit which is assigned to the functional unit and the sensor unit which is assigned to the carrier vehicle, as a result of which a construction can advantageously be simplified.

The sensor unit, in particular the sensor unit which is assigned to the functional unit and/or which is assigned to the carrier vehicle, advantageously has at least one rotational speed detection unit. The rotational speed detection unit advantageously has at least one light barrier and/or at least one acceleration sensor and/or at least one vibration sensor and/or at least one microphone. In a manner which is analogous with respect to customary rotational speed counters which are used in vehicles, the sensor unit preferably has at least one Hall sensor. As a result, in particular, a detection of the rotational speed of the attachment device and fixing of the setpoint value of the limit value can be achieved. External sensor units for detecting the rotational speed of the attachment device can advantageously be dispensed with.

Furthermore, it is proposed that the sensor unit, in particular the sensor unit which is assigned to the functional unit and/or which is assigned to the carrier vehicle, has at least one pressure detection unit. The pressure detection unit advantageously has at least one piezoelectric sensor and/or one strain gage and/or one wound spring element in an analogous manner with respect to customary Bourdon tube gages. The pressure detection unit preferably comprises at least one damping fluid, in particular for damping vibrations. The damping fluid can comprise, in particular, at least one oil. As a result, in particular, a detection of the input pressure of the carrier vehicle and fixing of the setpoint value of the limit value can be achieved. External sensor units for detecting the input pressure of the carrier vehicle can advantageously be dispensed with.

The functional unit advantageously has at least one axial piston adjustment motor. An "axial piston adjustment motor" is in particular to be understood as a hydraulic motor which is configured to transmit mechanical energy which is converted from hydraulic energy by way of at least one torque, and which has a variable displacement volume. A "displacement volume" is in particular to be understood as a volume of a hydraulic fluid which the axial piston adjustment motor moves during one revolution. A "hydraulic fluid" is to be understood to mean, in particular, a fluid which is configured to absorb hydraulic energy and to output it for converting the hydraulic energy into mechanical energy. The hydraulic fluid preferably has a viscosity which allows the hydraulic fluid to be pumped. In particular, the hydraulic fluid comprises at least one oil. In particular, in the case of a constant hydraulic fluid quantity which is supplied by the carrier vehicle, the displacement volume is anti-proportional with respect to a rotational speed of the axial piston adjustment motor and, in particular, proportional to a torque of the axial piston adjustment motor and, in particular, proportional to a torque of the axial piston adjustment motor. The axial piston adjustment motor advantageously has a minimum displacement volume and at least one maximum displacement volume. As a result, in particular, performance of the functional unit, in particular with respect to attachment devices which have hydraulic motors with a fixed displacement volume, can be improved. The displacement volume can advantageously be changed depending on a load of the attachment device to achieve a torque of the functional unit which is adapted to the load.

The limit value of the operating parameter of the functional unit is advantageously realized as a minimum or maximum displacement volume of the axial piston adjustment motor. In particular, the minimum displacement volume is a displacement volume in the case of which, in a load-free state of the attachment device, the rotor has the predefined nominal rotational speed. In particular, the maximum displacement volume is defined by way of a maximum hydraulic fluid capacity of the attachment device. In the case of an initial start-up of the attachment device, the control unit preferably controls and/or regulates a displacement volume of the attachment device from the maximum displacement volume as far as the minimum displacement volume. The control unit particularly preferably determines a value of the minimum displacement volume on the basis of at least one information item which is determined by the sensor unit. For example, the information item might comprise the rotational speed of the attachment device. In particular, the rotational speed is anti-proportional to the displacement volume. The control unit preferably monitors the rotational speed of the attachment device during a control and/or regulation of the displacement volume from the maximum displacement volume to the minimum displacement volume. The control unit particularly preferably stops the control and/or regulation of the displacement volume in the case of the predefined nominal rotational speed being reached by way of the rotational speed, and controls and/or regulates the minimum displacement volume to the currently set displacement volume. In one alternative refinement, the algorithm for the value of the minimum displacement volume might use the information item of the sensor unit and the nominal rotational speed for determining the minimum displacement volume in the case of the first initial start-up of the attachment device. In particular, the control unit controls and/or regulates the minimum displacement volume to the value. The control unit advantageously monitors the value in the operating state, and, in the case of a change of the value to a new value, controls and/or regulates the minimum displacement volume to the new value in the operating state. As a result, in particular, high performance of the axial piston adjustment motor can be achieved, in particular with respect to axial piston adjustment motors without an automatic control and/or regulation of the minimum and/or maximum displacement volume. The control and/or regulation of the minimum and/or maximum displacement volume can advantageously take place in all operating states of the attachment device.

It is proposed in a further refinement of the invention that the functional unit has at least one electric motor, and the limit value of the operating parameter is an electric limit value. An "electric motor" is to be understood to mean, in particular, a unit which, in at least one operating state, converts at least one form of electric energy into at least one form of mechanical energy. In particular, the electric motor has at least one rotor and at least one stator. The operating parameter can be implemented, for example, as an electric current, in particular an effective current and/or a peak current, an electric voltage, in particular an effective voltage and/or a peak voltage, and/or an electric power output. As a result, in particular, a high robustness of the functional unit can be achieved. Movable components, such as hydraulic fluid and/or pistons and/or mechanisms, might advantageously be dispensed with. A flexibility of the functional unit can particularly advantageously be achieved. In particular, a minimum delay can be achieved between a setting action and a setting.

The functional unit preferably has at least one comminution unit, in particular a comminuting rotor. A "comminution unit", in particular a "comminuting rotor", is in particular to be understood as a unit which is configured for a comminution of at least one material, in particular into pieces smaller than 10 cm$^3$, advantageously smaller than 8 cm$^3$, particularly advantageously smaller than 6 cm$^3$, preferably smaller than 4 cm$^3$, and particularly preferably smaller than 2 cm$^3$. The material might comprise, for example, snow and/or earth; the material preferably comprises at least one vegetable material, such as grass and/or wood. The comminution unit comminutes the material, in particular, by way of an action of a mechanical force, preferably a torque. For example, the comminution unit may have at least one rotor, on which at least one cutting tool for a comminution of material is arranged. In particular, the rotor might have a main direction of extent which, in at least one operating state, is oriented parallel to a direction of gravity. The rotor preferably has a main direction of extent which, in the operating state, is oriented perpendicularly with respect to a direction of gravity. As a result, in particular, simple comminution of material can be achieved. An exchange and/or an initial start-up of the attachment device for a comminution material can advantageously be carried out rapidly and simply.

Furthermore, the invention proceeds from a method for operating an attachment device with at least one functional unit which is supplied with energy by a carrier vehicle.

It is proposed that at least one limit value of an operating parameter of the functional unit is controlled and/or regulated automatically, as a result of which a simple and/or rapid initial start-up can advantageously be achieved. Manual operations and/or skilled staff for setting and/or regulating the limit value can advantageously be dispensed with, as a result of which, in particular, costs can be saved. A change and/or an initial start-up of the attachment device and/or carrier vehicle can particularly advantageously be carried out rapidly and simply. In addition, the attachment device can be operated with optimum settings for achieving an optimization of performance.

Further advantages result from the following description of the drawings. Two exemplary embodiments of the invention are shown in the drawing. The drawings, the description and the claims contain numerous features in combination. A person skilled in the art will expediently also consider the features individually and combine them to form appropriate further combinations.

Figure 1:
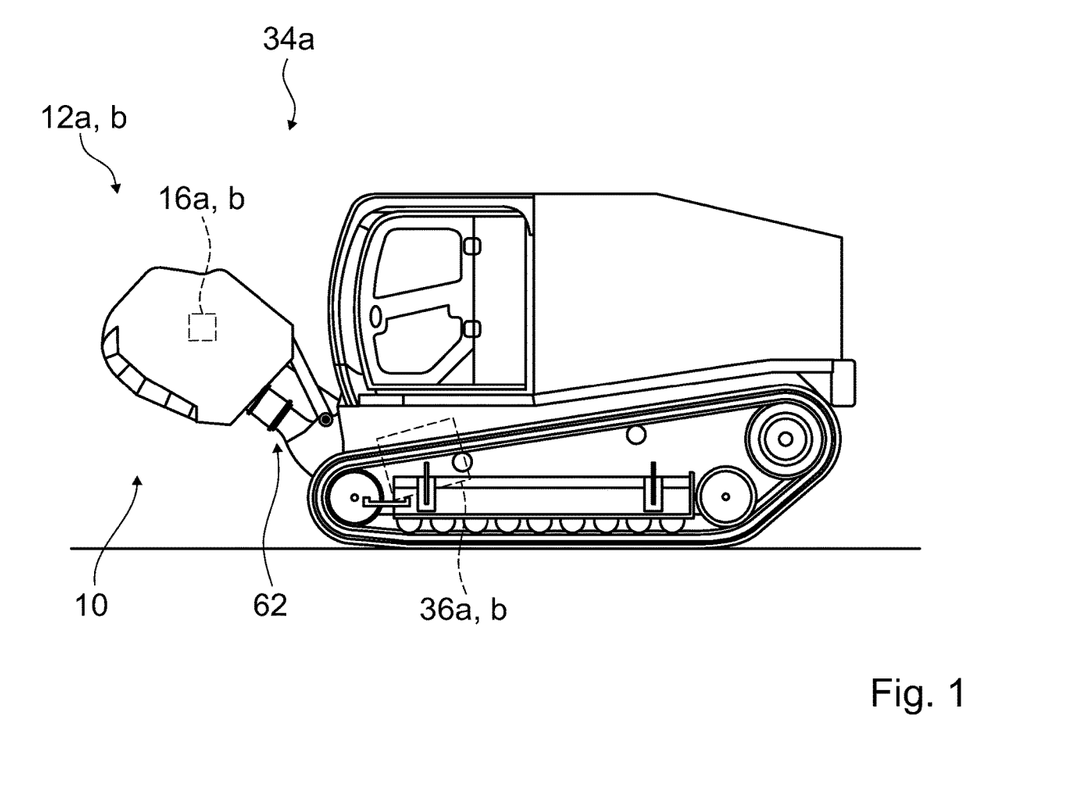
FIG. 1 shows a system with a carrier vehicle and an attachment device in a diagrammatic illustration.

FIG. 1 shows a system 34a with a carrier vehicle 10 and an attachment device 12a. The carrier vehicle 10 is embodied as a tracked vehicle. As an alternative, however, the carrier vehicle 10 could also be embodied as any desired vehicle which is deemed suitable by a person skilled in the art, for example as a tractor, an excavator, a skid steer loader or as a wheel loader. The attachment device 12a is arranged on the carrier vehicle 10. The attachment device 12a is implemented as a mulcher. As an alternative, the attachment device 12a could also be implemented as a milling machine, in particular a snow blower, a stump grinder or a rotavator. The attachment device 12a is configured for use with a multiplicity of carrier vehicles, in particular a multiplicity of types of carrier vehicles and, in particular, also with the carrier vehicle 10. The carrier vehicle 10 has a support unit 62. The support unit 62 cooperates with corresponding support means (not shown) of the attachment device 12a in a mounted state. The corresponding support means of the attachment device 12a can cooperate with further support units (not shown) of a multiplicity of types of carrier vehicles.

Figure 2:
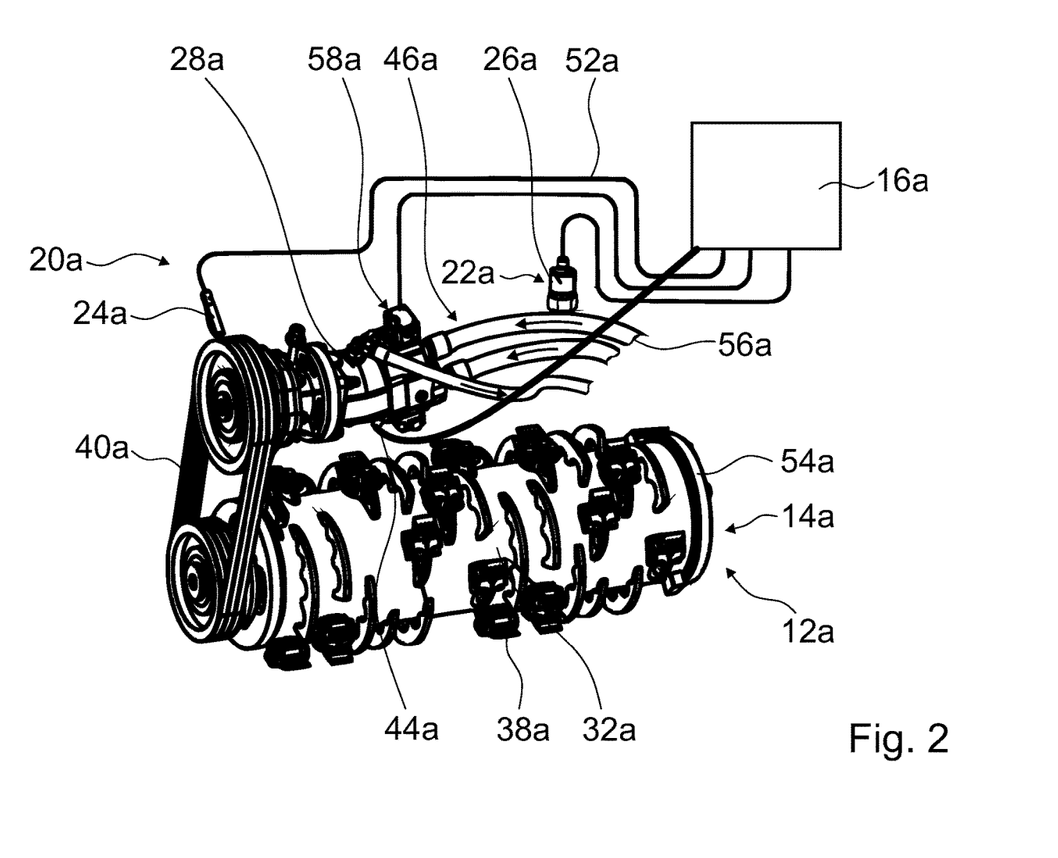
FIG. 2 shows a part of the attachment device in a more detailed, diagrammatic illustration.

A part of the attachment device 12a is shown in greater detail in FIG. 2. The attachment device 12a has a functional unit 14a. The functional unit 14a has a comminution unit 32a. The comminution unit 32a has a rotor 54a. The comminution unit 32a has a multiplicity of cutting tools 38a. The cutting tools 38a are arranged on the rotor 54a. The cutting tools 38a are implemented identically to one another, for which reason only one of the cutting tools 38a is provided with a reference numeral in the figures.

The functional unit 14a has an axial piston adjustment motor 28a for driving the rotor 54a. The axial piston adjustment motor 28a converts a form of hydraulic energy into a form of mechanical energy. The axial piston adjustment motor 28a has a rotor unit (not shown). The rotor unit is arranged within an interior space (not shown) of the axial piston adjustment motor 28a. The interior space serves to receive hydraulic fluid which transmits the hydraulic energy to the rotor unit. The mechanical energy produces a torque of the rotor unit. The axial piston adjustment motor 28a transmits the torque via an energy transmission unit 40a, to be precise, in particular, a belt drive, to the rotor 54a.

The functional unit 14a is configured for a supply of energy by way of the carrier vehicle 10. The carrier vehicle 10 has a supply unit 36a. The supply unit 36a is configured to supply the functional unit 14a with energy. The supply unit 36a has a hydraulic pump. The hydraulic pump could be embodied as an electrically driven hydraulic pump. As an alternative, the supply unit 36a might have a hydraulic pump which is driven by internal combustion. The carrier vehicle 10 has a connecting unit 46a. The connecting unit 46a is configured to provide for a transmission of energy from the hydraulic pump to the attachment device 12a. The connecting unit 46a has a plurality of hoses 56a. The hoses 56a are of identical implementation with respect to one another, for which reason only one of the hoses 56a is given a reference numeral in the figures. The hoses 56a provide a discharge and a feed of the hydraulic fluid. The flow direction of the hydraulic liquid within the hoses 56a is shown by way of arrows.

The attachment device 12a has an adjusting unit 44a. The adjusting unit 44a serves to set a minimum displacement volume of the axial piston adjustment motor 28a. The adjusting unit 44a serves to set a maximum displacement volume of the axial piston adjustment motor 28a. The adjusting unit 44a has a solenoid valve for changing the minimum and/or maximum displacement volume. In the case of opening and closing of the solenoid valve, a volume of the interior space of the axial piston adjustment motor 28a decreases or increases. The attachment device 12a has a passage unit 58a. The passage unit 58a serves to set a displacement volume of the axial piston adjustment motor 28a. The passage unit 58a can have, for example, a further solenoid valve and/or a solenoid flap. The adjusting unit 44a and the passage unit 58a in each case have a motor unit (not shown). The motor units can have, for example, electromagnets. The electromagnets provide opening and closing of the solenoid valves and/or the solenoid flap.

The attachment device 12a has a control unit 16a. In at least one operating state, the control unit 16a controls at least one limit value of an operating parameter of the functional unit 14a. The control unit 16a controls the limit value automatically in the operating state. The operating parameter is realized as a displacement volume of the attachment device 12a. The limit value is realized as the minimum displacement volume. The control unit 16a controls a further limit value automatically in the operating state. The further limit value is realized as the maximum displacement volume.

The control unit 16a controls the limit value and the further limit value of the operating parameter of the functional unit 14a electrically. The control unit 16a regulates the operating parameter of the functional unit 14a electrically. The control unit 16a is connected by way of a transmission unit 52a to the second adjusting unit 44a. The transmission unit 52a is realized as a data line. Further transmission units which are mentioned in the following text are realized identically to the transmission unit 52a, for which reason a more detailed description of the further transmission units is dispensed with.

The attachment device 12a has a sensor unit 20a which is assigned to the functional unit. The sensor unit 20a serves to detect a value of a rotational speed of the rotor 54a. The sensor unit 20a provides the value to the control unit 16a for processing. The sensor unit 20a is connected by way of a further transmission unit 52a to the control unit 16a. The sensor unit 20a has a rotational speed detection unit 24a. The rotational speed detection unit 24a has a light barrier. As an alternative and/or in addition, the rotational speed detection unit 24a might have a microphone and/or a vibration sensor and/or an acceleration sensor. The sensor unit 20a is arranged in the close vicinity of the rotor 54a. The sensor unit 20a measures the rotational speed of the rotor 54a. As an alternative, the sensor unit 20a might be arranged in the close vicinity of the energy transmission unit 40a, and might measure a further rotational speed of the axial piston adjustment motor 28a for determining the rotational speed of the rotor 54a. As an alternative, the sensor unit 20a could be implemented integrally with the axial piston adjustment motor 28a.

The attachment device 12a has a further sensor unit 22a which is assigned to the carrier vehicle. The further sensor unit 22a serves to detect a value of an input pressure of the carrier vehicle 10. The further sensor unit 22a provides the value to the control unit 16a for processing. The further sensor unit 22a is connected by way of a further transmission unit 52a to the control unit 16a. The further sensor unit 22a has a pressure detection unit 26a. The pressure detection unit 26a has a piezoelectric pressure sensor. As an alternative and/or in addition, the pressure detection unit 26a might have a wound spring element and/or a strain gage. The further sensor unit 22a is arranged in the close vicinity of the connecting unit 46a.

The control unit 16a controls the limit value and the further limit value of the operating parameter of the functional unit 14a to a setpoint value and a further setpoint value. The setpoint value and the further setpoint value are defined by way of the rotational speed of the rotor 54a and the input pressure of the carrier vehicle 10. The setpoint value is realized as a minimum displacement volume which produces a predefined nominal rotational speed of the rotor 54a in a load-free state of the attachment device 12a. The further setpoint value is realized as a maximum displacement volume; damage of the axial piston adjustment motor 28a would occur in the case of said maximum displacement volume being exceeded. The control unit 16a has an algorithm which determines the setpoint value and the further setpoint value with use of the rotational speed and the input pressure of the carrier vehicle 10.

The control unit 16a controls a further operating parameter of the functional unit 14a by way of a control operation of the limit value of the operating parameter of the functional unit 14a. The further operating parameter is realized as a performance value of the functional unit 14a. The further operating parameter is dependent on the operating parameter, the rotational speed and the input pressure. The algorithm determines a maximum value of the further operating parameter with use of the rotational speed, the input pressure and the operating parameter. The control unit 16 regulates the operating parameter to a value which maximizes the further operating parameter.

Figure 3:
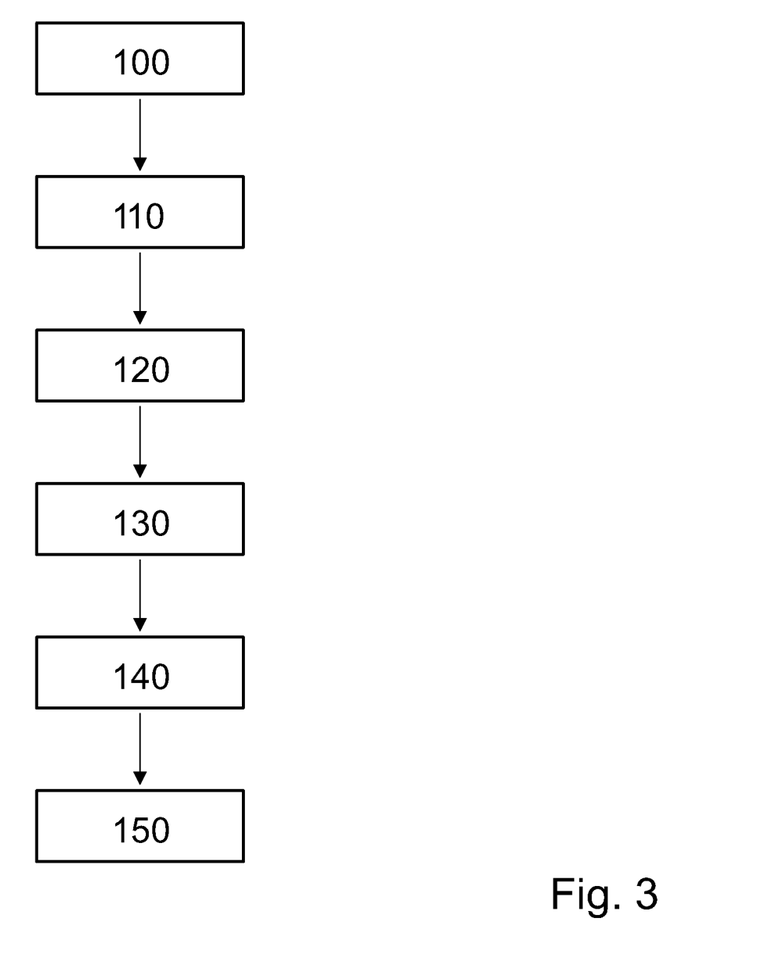
FIG. 3 shows a diagrammatic process chart of a method for operating the attachment device.

FIG. 3 shows a diagrammatic process chart of a method for operating the attachment device 12a. In an activation step 100a, the carrier vehicle 10 and the attachment device 12a are transferred into the operating state. In a measuring step 110a, the further sensor unit 22a determines a value of the input pressure of the carrier vehicle 10. The further sensor unit 22a transmits the value via the transmission unit 52a to the control unit 16a. The control unit 16a determines the further setpoint value of the maximum displacement volume with use of the value of the input pressure. The control unit 16a has a memory unit (not shown). The memory unit is embodied as a customary electronic storage medium. The control unit 16a stores the further setpoint value of the maximum displacement volume by way of the memory unit. Here, the measuring step 110a follows the activation step 100a. After the measuring step 110a and during the operation of the attachment device 12a, the further sensor unit 22a determines, furthermore, the value of the input pressure and transmits it to the control unit 16a. In an adjustment step 120a, the control unit 16a controls the adjusting unit 44a. The control unit 16a opens or closes the solenoid valve of the adjusting unit 44a by way of a control operation of the electromagnet of the adjusting unit 44a. The control unit 16a controls the maximum displacement volume automatically to the further setpoint value. Here, the adjustment step 120a follows the measuring step 110a. The control unit 16a monitors the maximum displacement volume after the adjustment step 120a. In the case of a change of the value of the input pressure, the control unit 16a determines a new further setpoint value with use of the new value of the input pressure, and repeats the adjustment step 120a.

In a further measuring step 130a, the displacement volume of the axial piston adjustment motor 28a is lowered continuously from the maximum displacement volume. The control unit 16a regulates the passage unit 58a automatically for regulating the displacement volume. The control unit 16a closes the solenoid valve and/or the solenoid flap of the passage unit 58a by way of a regulation of the motor unit of the passage unit 58a. During lowering of the displacement volume, the rotational speed of the rotor 54a increases. The first sensor unit 20a determines a value of the rotational speed of the rotor 54a during lowering of the displacement volume. The first sensor unit 20a transmits the value via the transmission unit 52a to the control unit 16a. The control unit 16a monitors the value automatically. When the value reaches a predefined nominal rotational speed, the control unit 16a stops the lowering of the displacement volume. The value is realized as the setpoint value of the minimum displacement volume. The control unit 16a stores the setpoint value of the minimum displacement volume by way of the memory unit. In the case of a change of the minimum displacement volume and/or the maximum displacement volume, for example as a result of the use of the attachment device 12a with a further carrier vehicle (not shown) which is different than the carrier vehicle 10, the control unit 16a can use the stored setpoint value and/or further setpoint value in the case of renewed mounting of the attachment device 12a on the carrier vehicle 10. The measuring steps 110a, 130a are dispensed with in this case. The further measuring step 130a follows the adjustment step 120a. After the further measuring step 130a and during the operation of the attachment device 12a, the sensor unit 20a determines, furthermore, the value of the rotational speed and transmits it to the control unit 16a. In a further adjustment step 140a, the control unit 16a controls the adjusting unit 44a. The control unit 16a opens or closes the solenoid valve of the adjusting unit 44a by way of a control of the electromagnet of the adjusting unit 44a. The control unit 16a controls the minimum displacement volume of the axial piston adjustment motor 28a automatically to the instantaneous displacement volume. The further adjustment step 140a follows the measuring step 110a or the activation step 100a in the case of a setpoint value which is already present. The control unit 16a monitors the minimum displacement volume after the further adjustment step 140a. In the case of a change of the value of the input pressure, the control unit 16a determines a new setpoint value with use of the new value of the input pressure, and repeats the further adjustment step 140a.

In a regulating step 150a, the control unit 16a determines an optimum value of the displacement volume with use of the value of the rotational speed of the rotor 54a and the value of the input pressure of the carrier vehicle 10. The value of the input pressure of the carrier vehicle 10 is determined by the further sensor unit 22a, and is transmitted by way of the transmission unit 52a to the control unit 16a. The optimum value is a value of the displacement volume in the case of which performance of the functional unit 14a is at a maximum. The control unit 16a regulates the displacement volume to the optimum value. The control unit 16a opens or closes the solenoid valve and/or the solenoid flap of the passage unit 58a by a regulation of the electromagnet of the passage unit 58a. The control unit 16a regulates the performance of the functional unit 14a to a maximum value. The control unit 16a monitors the displacement volume after the regulating step 150a. In the case of a change of the values which are determined by the sensor units 20a, 22a, the control unit 16a repeats the regulating step 150a. Here, the regulating step 150a follows the further adjustment step 140a.

Figure 4:
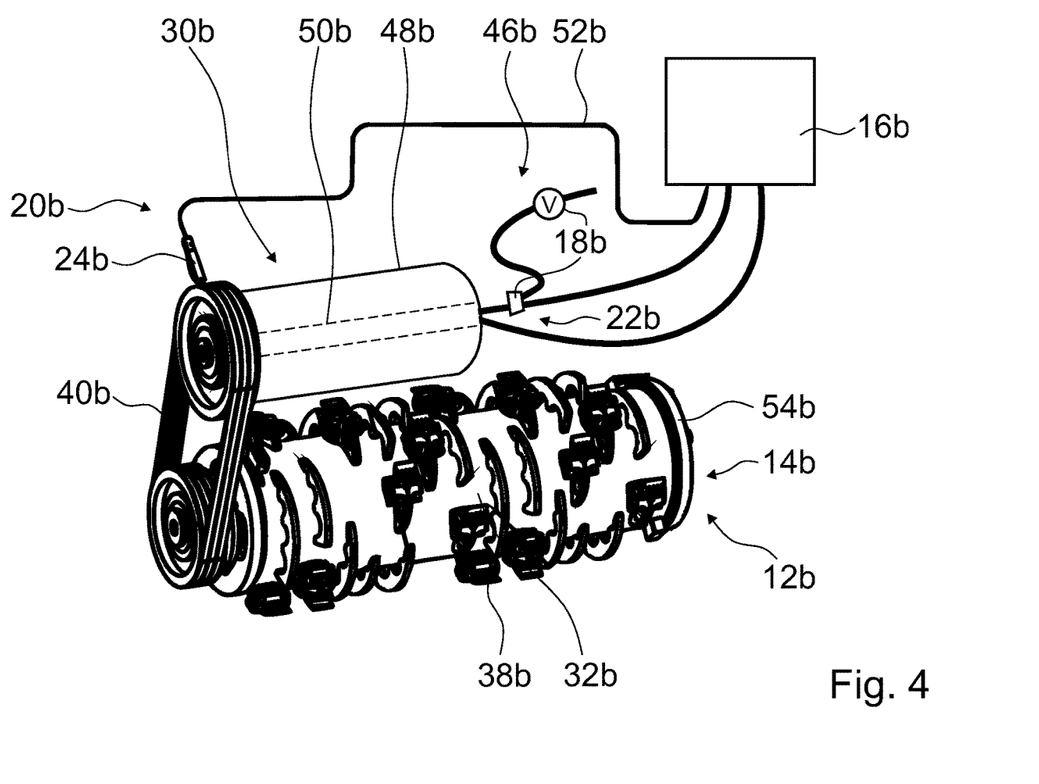
FIG. 4 shows a part of a further attachment device in a more detailed diagrammatic illustration.

FIG. 4 shows a further exemplary embodiment of the invention. The following descriptions and the drawings are restricted substantially to the differences between the exemplary embodiments, it being possible fundamentally for reference also to be made to the drawings and/or the description of the other exemplary embodiments, in particular of FIGS. 1 to 3, with regard to method steps with an identical designation and with regard to unchanged components, in particular in relation to method steps and/or components having the same reference numerals. The letter a is added reference numerals of the exemplary embodiment in FIGS. 1 to 3 in order to distinguish the exemplary embodiments. The letter a is replaced by the letter b in the exemplary embodiment of FIG. 4.

FIG. 4 shows a part of a further attachment device 12b. The further attachment device 12b is configured for use with a multiplicity of carrier vehicles, in particular a multiplicity of types of carrier vehicles and, in particular, also with the carrier vehicle 10. Instead of the axial piston adjustment motor 28a, the further attachment device 12b has an electric motor 30b. The electric motor 30b has a magnetic rotor 50b. The electric motor 30b has a stator 48b. A further control unit 16b controls an electric limit value of an operating parameter of the further attachment device 12b. The operating parameter is realized as an electric current. As an alternative, the operating parameter may be realized as an electric voltage and/or an electric power output. The electric limit value is realized as a maximum current which is supplied to a functional unit 14b. The electric limit value has a threshold value. Damage of the electric motor 30b can occur in the case of the threshold value being exceeded. The electric limit value is, in particular, dependent on a voltage which is supplied by a supply unit 36b and on a maximum current which is supplied by the supply unit 36b.

A connecting unit 46b is implemented as an electric line. A sensor unit 22b has a current detection unit 18b. The current detection unit 18b has a voltage sensor. The voltage sensor taps off a voltage of the connecting unit 46b. The current detection unit 18b has a current sensor. The current sensor is connected between the connecting unit 46b and the electric motor 30b. The further sensor unit 22b determines the maximum current which is supplied by the supply unit 36b. The further sensor unit 22b determines the voltage which is supplied by the further supply unit 36b. The control unit 16b is connected by way of the transmission unit 52b to the electric motor 30b. The control unit 16b has a pulse width modulation function. The control unit 16b determines a setpoint value of the pulse width with the use of the maximum current which is supplied by the supply unit 36b, the voltage which is supplied by the supply unit 36b, and the threshold value. The control unit 16b controls the pulse width to the setpoint value.

REFERENCE NUMERALS

10 Carrier vehicle
12 Attachment device
14 Functional unit
16 Control unit
18 Current detection unit
20 Sensor unit
22 Sensor unit
24 Rotational speed detection unit
26 Pressure detection unit
28 Axial piston adjustment motor
30 Electric motor
32 Comminution unit
34 System
36 Supply unit
38 Cutting tool
40 Energy transmission unit
44 Adjusting unit
46 Connecting unit
48 Stator
50 Magnetic rotor
52 Transmission unit
54 Rotor
56 Hose
58 Passage unit
62 Support unit
100 Activation step 110 Measuring step
120 Adjustment step
130 Measuring step
140 Adjustment step
150 Regulating step

The invention claimed is:

1. A milling machine or mulcher, for use with a carrier vehicle, with at least one functional unit which is configured for a supply of energy by way of the carrier vehicle, comprising at least one control unit which, in at least one operating state, automatically controls or regulates at least one limit value of an operating parameter of the functional unit.

2. The milling machine or mulcher as claimed in claim 1, wherein the control unit electrically controls or regulates the limit value of the operating parameter of the functional unit or the operating parameter of the functional unit in the operating state.

3. The milling machine or mulcher as claimed in claim 1, wherein the control unit controls or regulates the limit value of the operating parameter of the functional unit to a setpoint value in the operating state.

4. The milling machine or mulcher as claimed in claim 3, wherein the control unit controls or regulates a further operating parameter of the functional unit in the operating state by a control or regulation of the limit value of the operating parameter of the functional unit.

5. The milling machine or mulcher as claimed in claim 1, further comprising at least one sensor unit for the detection of at least one value of at least one operating parameter of the functional unit, the sensor unit providing said value to the control unit for processing in the operating state.

6. The milling machine or mulcher as claimed in claim 1, further comprising at least one sensor unit for the detection of at least one value of at least one operating parameter of the carrier vehicle, the sensor unit providing said value to the control unit for processing in the operating state.

7. The milling machine or mulcher as claimed in claim 5, wherein the sensor unit has a rotational speed detection unit.

8. The milling machine or mulcher as claimed in claim 5, wherein the sensor unit has a pressure detection unit.

9. The milling machine or mulcher as claimed in claim 1, wherein the functional unit has at least one axial piston adjustment motor.

10. The milling machine or mulcher as claimed in claim 9, wherein the limit value of the operating parameter of the functional unit is a minimum or maximum displacement volume of the axial piston adjustment motor.

11. The milling machine or mulcher as claimed in claim 1, wherein the functional unit has at least one electric motor, and the limit value of the operating parameter of the functional unit is an electric limit value.

12. The milling machine or mulcher as claimed in claim 1, wherein the functional unit has at least one comminution unit.

13. A system with at least one milling machine or mulcher as claimed in claim 1 and with the carrier vehicle.

14. The milling machine or mulcher as claimed in claim 1, wherein the at least one limit value of an operating parameter is a predefined value of the operating parameter which cannot be reduced or increased further in the at least one operating state.

15. The milling machine or mulcher as claimed in claim 1, wherein the at least one limit value of an operating parameter is the basis of which the control unit initiates at least one predefined process if the at least one limit value should be exceeded or undershot.

16. The milling machine or mulcher as claimed in claim 1, wherein the at least one limit value comprises a maximum, a minimum or a threshold value.

17. A method for operating the milling machine or mulcher as claimed in claim 1, with the at least one functional unit which is configured for the supply of energy by way of the carrier vehicle, the milling machine or mulcher comprising the at least one control unit, the method comprising:
in the at least one operating state, automatically controlling or regulating, by the at least one control unit, the at least one limit value of the operating parameter of the functional unit.

18. The method as claimed in claim 17, further comprising, by the control unit, electrically controlling or regulating the limit value of the operating parameter of the functional unit or the operating parameter of the functional unit in the operating state.

19. The method as claimed in claim 17, further comprising, by the control unit, controlling or regulating the limit value of the operating parameter of the functional unit to a setpoint value in the operating state.

20. The method as claimed in claim 19, further comprising, by the control unit, controlling or regulating a further operating parameter of the functional unit in the operating state by controlling or regulating the limit value of the operating parameter of the functional unit.

21. The method as claimed in claim 17, wherein the milling machine or mulcher further comprises at least one sensor unit for the detection of at least one value of at least one operating parameter of the functional unit, further comprising, by the sensor unit, providing said value to the control unit for processing in the operating state.

22. The method as claimed in claim 20, wherein the sensor unit has a rotational speed detection unit.

23. The method as claimed in claim 17, wherein the milling machine or mulcher further comprises at least one sensor unit for the detection of at least one value of at least one operating parameter of the carrier vehicle, further comprising, by the sensor unit, providing said at least one value to the control unit for processing in the at least one operating state.

* * * * *